US012022902B2

(12) United States Patent
Lim et al.

(10) Patent No.: US 12,022,902 B2
(45) Date of Patent: Jul. 2, 2024

(54) SELF-CUSTOMIZED microLED WIG

(71) Applicants: Seong Kyu Lim, Daegu (KR); Myeong Hee Kim, Daegu (KR); Jong Ho Lim, Daegu (KR); Jong Yoon Lim, Daegu (KR)

(72) Inventors: Seong Kyu Lim, Daegu (KR); Myeong Hee Kim, Daegu (KR); Jong Ho Lim, Daegu (KR); Jong Yoon Lim, Daegu (KR)

( * ) Notice: Subject to any disclaimer, the term of this patent is extended or adjusted under 35 U.S.C. 154(b) by 367 days.

(21) Appl. No.: 17/610,513

(22) PCT Filed: May 13, 2020

(86) PCT No.: PCT/KR2020/006268

§ 371 (c)(1),
(2) Date: Nov. 11, 2021

(87) PCT Pub. No.: WO2020/231167

PCT Pub. Date: Nov. 19, 2020

(65) Prior Publication Data

US 2022/0218061 A1 Jul. 14, 2022

(30) Foreign Application Priority Data

May 13, 2019 (KR) ........................ 10-2019-0055885

(51) Int. Cl.
*F21V 33/00* (2006.01)
*A41G 3/00* (2006.01)
(Continued)

(52) U.S. Cl.
CPC ......... *A41G 3/0041* (2013.01); *A41G 3/0083* (2013.01); *F21V 33/0004* (2013.01);
(Continued)

(58) Field of Classification Search
CPC .... A41G 3/0041; A41G 3/0083; H05B 47/11; H05B 47/19; F21V 33/0004; G09G 3/32; G09G 2320/0626
See application file for complete search history.

(56) References Cited

U.S. PATENT DOCUMENTS 3,758,771 A * 9/1973 Frohardt ............ A44C 15/0015 385/115
D652,167 S * 1/2012 Bonang .......................... D28/42
(Continued)

FOREIGN PATENT DOCUMENTS

EP 3295820 B1 5/2019
JP 2004-131873 A 4/2004
(Continued)

OTHER PUBLICATIONS

International Search Report dated Sep. 14, 2020 for corresponding International Patent Application No. PCT/KR2020/006268.
(Continued)

*Primary Examiner* — Anne M Hines
(74) *Attorney, Agent, or Firm* — Hauptman Ham, LLP

(57) ABSTRACT

The present invention relates to a self-customized microLED wig. More specifically, one self-customized microLED wig comprises: a base plate (100) wrapped around the circumference of a wearer's head; hair parts (200) configured on the base plate; and a transparent microLED display skin (300) configured to cover the outer surfaces of the hair parts, wherein a master part (400) and a remote slave (500) are configured inside the base plate (100) so as to control the transparent microLED display skin (300), and a smart phone (600) is configured to enable the wearer to finally and selectively control the transparent microLED display skin (300), whereby the present invention is a useful invention which enables colors of the hair parts
(Continued)

(200) to be variously changed according to the wearer's current situation.

4 Claims, 8 Drawing Sheets

(51) Int. Cl.
*G09G 3/32* (2016.01)
*H05B 47/11* (2020.01)
*H05B 47/19* (2020.01)

(52) U.S. Cl.
CPC ............... *G09G 3/32* (2013.01); *H05B 47/11* (2020.01); *H05B 47/19* (2020.01); *G09G 2320/0626* (2013.01); *G09G 2330/021* (2013.01); *G09G 2360/144* (2013.01); *G09G 2370/06* (2013.01)

(56) References Cited

U.S. PATENT DOCUMENTS

| | | | |
|---|---|---|---|
| 9,977,267 B2 | 5/2018 | Grundhofer | |
| 10,429,057 B1 * | 10/2019 | Templer | A41D 27/085 |

FOREIGN PATENT DOCUMENTS

| | | |
|---|---|---|
| KR | 10-2009-0009675 A | 1/2009 |
| KR | 10-2012-0050572 A | 5/2012 |

OTHER PUBLICATIONS

Written Opinion dated Sep. 14, 2020 for corresponding International Patent Application No. PCT/KR2020/006268.

* cited by examiner

SELF-CUSTOMIZED microLED WIG

CROSS-REFERENCE TO RELATED APPLICATION

The present application is a national stage filing under 35 U.S.C § 371 of PCT application number PCT/KR2020/006268 filed on May 13, 2020 which is based upon and claims the benefit of priority to Korean Patent Application No. 10-2019-0055885, filed on May 13, 2019, in the Korean Intellectual Property Office. Both of the aforementioned applications are hereby incorporated by reference in their entireties.

TECHNICAL FIELD

The present invention relates to a self-customized microLED wig, and more specifically, to a technique capable of expressing a single color or a variety of colors of a hair unit of a normal wig according to a situation by coating a transparent microLED display skin that can selectively express a color and a design on the outer surface of the hair unit.

BACKGROUND ART

Although wigs serve to protect the scalp from sunlight, they are also used to show off the appearance or boast social status in many cases. History of wigs goes back to around 5000 to 6000 BC, and images of women wearing a wig may be frequently found on murals and stone statues in Chile and Egypt, and history of wigs in Korean is very long dating back to the period of Three Kingdoms. That is, the most ultimate purpose of the wigs is to be used to hide hair loss caused by congenital or acquired factors, and recently, in addition to using the wigs to hide hair loss, the utility as a fashion item has been sufficiently recognized through the Internet or broadcasting. Currently, the wigs have become an accessory used when a person desires to feel better mood or change an image once in a while, and they are widely used even when a user uses a wig for a relatively short period of time to produce various hairstyles.

For example, wigs of various colors are often used as props for successful performances in a ceremony, festival, party, or event on a street, and when a wig may emit light to change colors variously for this event purpose, it may have an effect of being more interesting and attentive in the dark.

Meanwhile, although a wig may emit light by coating a photoluminescent agent or the like on the hair of the wig, there is a problem in that as only light of one color is emitted with low brightness, the wig looks dark at night and is difficult to identify during the daytime.

In addition, as the light emitting effect of the photoluminescent agent is not continued and the wig may be used only for a short period of time, it is troublesome to purchase many wigs, and the economic efficiency is extremely low.

First, conventional techniques are described below.

Korean Patent Registration No. 10-1279558 discloses a technique related to a light emitting wig using fiber optic yarn, which is configured of a support that is worn on the head and a plurality of extension hairs planted on the support, and the wig comprises: a PCB attached to the support and equipped with a plurality of light sources; a battery for supplying power to the PCB; a switch for controlling turning on or off of the light sources; and a plurality of fiber optic yarn hairs planted to contact with the light sources of the PCB at one end to transfer light, wherein the PCB is stored in a case, a planting unit is formed on the top of the case, and the plurality of optical fiber yarn hairs is planted in the planting unit.

The conventional technique mentioned above mainly describes a technique of radiating a light source to optical fiber yarn so that light is radiated to the hair. However, the technical configurations have a problem in that it is difficult to use for an extended period of time due to the large battery consumption, and there is no choice but to create a somewhat artificial atmosphere by using fiber optic hairs instead of conventional hairs.

DISCLOSURE OF INVENTION

Technical Problem

Therefore, the present invention has been made in view of the above problems, and it is an object of the present invention to provide a self-customized microLED wig basically comprising, like the configuration of conventional wigs, a base plate to be worn on the head of a user, and a plurality of hair units configured on the top of the base plate. As a transparent microLED display skin is configured to be coated on the outer surface of the hair units, and a master unit for selectively controlling the transparent microLED display skin and a remote slave spaced apart from the master unit by a predetermined distance and wirelessly communicating with the master unit are configured inside the base plate, the transparent microLED display skin may express a single color or a variety of colors.

Technical Solution

To accomplish the above object, according to one aspect of the present invention, there is provided a self-customized microLED wig capable of emitting light, the wig comprising: a base plate 100 worn and fixed on a person's head; a plurality of hair units 200 configured on the top of the base plate 100 to be spaced apart from each other at regular intervals; a transparent microLED display skin 300 configured to include a transparent flexible substrate 310 having transparency and flexibility, and a semiconductor device layer 320 having microLED pixels 330 transferred and attached on the transparent flexible substrate 310, and fully or partly coated on the surface of the hair unit 200; a master unit 400 configured on the base plate 100 and provided with a power switch 410 for controlling a power supply unit 430, a charging port 420 for charging a battery through a USB cable, the power supply unit 430 controlled by the power switch 410, the battery 440 for storing power charged through the charging port 420, a wireless power supply unit 450 having a wireless electric coil to wirelessly supply power to the power supply unit 430, a short-range wireless communication unit 460 for performing short-range wireless communication with external devices and other devices including a smartphone 600, a main control unit 470 for controlling color expression in the transparent microLED display skin 300 of the hair unit 200, an energy harvesting unit 480 for self-generation of energy, and a photodetector 490 for detecting brightness of light outside the wig; a remote slave 500 configured at a position spaced apart from the master unit 400 of the base plate 100 by a predetermined distance, and provided with a wireless electric antenna 510 for receiving power generated by the wireless power supply unit 450, a remote control unit 520 for driving and controlling the transparent microLED display skin 300, a transceiver unit 530 for performing close proximity remote transmission and reception with the master unit 400, an energy harvesting unit 540 for self-generation of energy, and a photodetector 550 for detecting brightness of light outside the wig; and the smartphone 600 including an APP capable of controlling the main control unit 470 or the remote control unit 520 of the master unit 400 or the remote slave 500 through a short-range wireless communication method with the short-range wireless communication unit 460 of the master unit 400.

The photodetectors 490 and 550 detect an amount of external light applied to the wig, and then apply them to the main control unit 470 and the remote control unit 520, and the main control unit 470 and the remote control unit 520 control display luminance brightness of the transparent microLED display skin 300 based on the received amount of light.

The energy harvesting units 480 and 540 are configured of any one or a combination of a photoelectric element, a thermoelectric element, a piezoelectric element, and a wireless electric conversion element.

When a specific transparent microLED display skin 300 is controlled through the APP, the transparent microLED display skin 300 is controlled by the master unit 400 or the remote slave 500 close to the specific transparent microLED display skin 300.

Advantageous Effects

According to the self-customized microLED wig of the present invention, since it is possible to immediately respond to a situation in the field as various colors and glittering particles may be fully or partly changed with ease in accordance with decorations for self-expression or the current situation of a user in a ceremony, festival, party, or event, while maintaining the original purpose of wigs used recently, this is a useful invention that can enhance the fun and satisfaction of users and have an effect of using for an extended period of time owing to low power consumption, rechargeable battery, and autonomous power supply.

Figure 1:
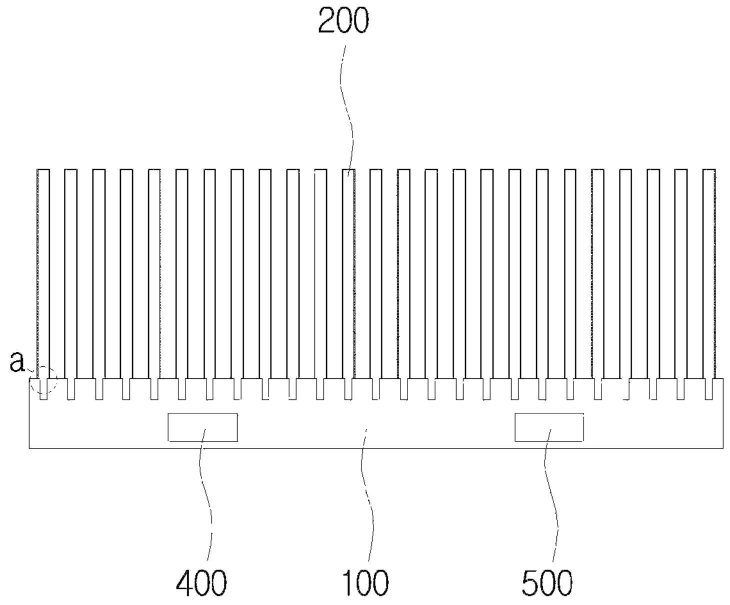
FIG. 1 is a front cross-sectional view and an enlarged view showing a preferred embodiment of the present invention.
Figure 1:
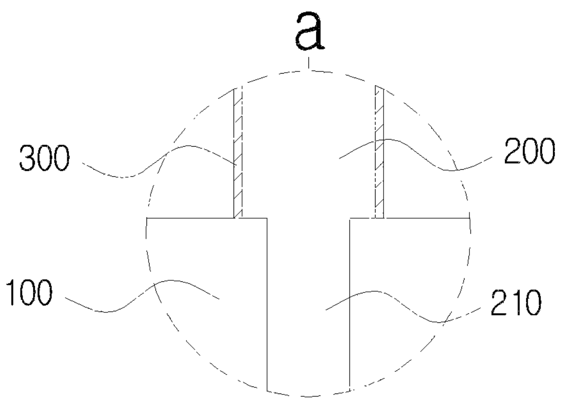

| DESCRIPTION OF SYMBOLS |
|---|
| 100: base plate |
| 110: insertion hole |
| 120: motor |

-continued

| DESCRIPTION OF SYMBOLS |
|---|
| 200: hair unit |
| 210: insertion unit |
| 300: transparent microLED display skin |
| 310: transparent flexible substrate |
| 320: semiconductor device layer |
| 330: microLED pixel |
| 331: positive electrode layer |
| 332: transparent conductive layer |
| 333: transparent p-electrode layer |
| 334: p-GaN layer |
| 335: active layer |
| 336: n-Gan layer |
| 337: transparent n-electrode layer |
| 338: transparent insulating layer |
| 400: master unit |
| 410: power switch |
| 420: charging port |
| 430: power unit |
| 440: battery |
| 450: wireless power supply unit |
| 460: short-range wireless communication unit |
| 470: main control unit |
| 480: energy harvesting unit |
| 490: light detection unit |
| 500: remote slave |
| 510: wireless electric antenna |
| 520: remote control unit |
| 530: transceiver unit |
| 540: energy harvesting unit |
| 550: light detection unit |
| 600: smartphone |

BEST MODE FOR CARRYING OUT THE INVENTION

Although people expressed their individuality through hair dyeing in the past, in the case of hair dyeing, the dyed hair color of one color or multiple colors should be maintained as is until next dyeing, and the unique color of the hair is added as the hair grows, and in addition, when dyeing is continued, there are many problems from the aspect of hair damage, money, and time.

Therefore, in the present invention, since a wig wearer may act as a hair designer to instantaneously change the color of all or part of the hair with ease and to make the wig radiate light and generate various effects such as glittering or the like according to the environment or mood, a self-customized microLED wig which can express a single color or a variety of colors and glittering of a hair unit according to a situation may be provided by coating a transparent microLED display skin that can selectively express a color and a design on the outer surface of the hair unit of the wig as a concept of a final hair fashion of wig.

Hereinafter, a preferred embodiment of the present invention for achieving the above objects in relation to the accompanying drawings will be described with reference to FIGS. 1 to 8.

First, the present invention provides a self-customized microLED gig comprising: a base plate 100 worn on the head of a wearer, a hair unit 200 configured on the base plate 100, a transparent microLED display skin 300 fully or partly coated on the surface of the hair unit 200, a master unit 400 and a remote slave 500 configured on the base plate 100, and a smartphone 600 for selectively controlling the master unit 400 and the remote slave 500.

Figure 2:
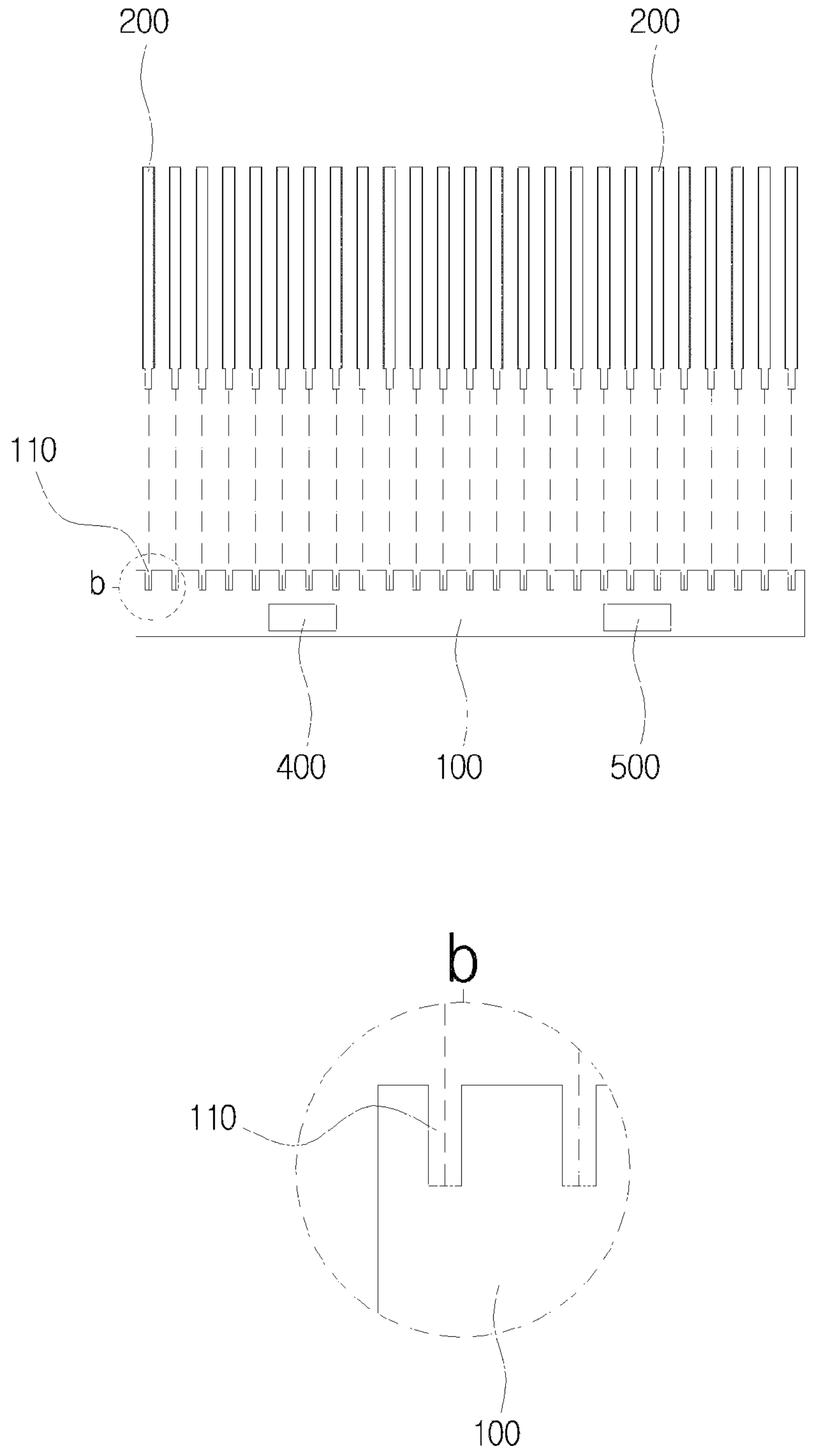
FIG. 2 is an exploded view and an enlarged view showing a preferred embodiment of the present invention.
Figure 3:
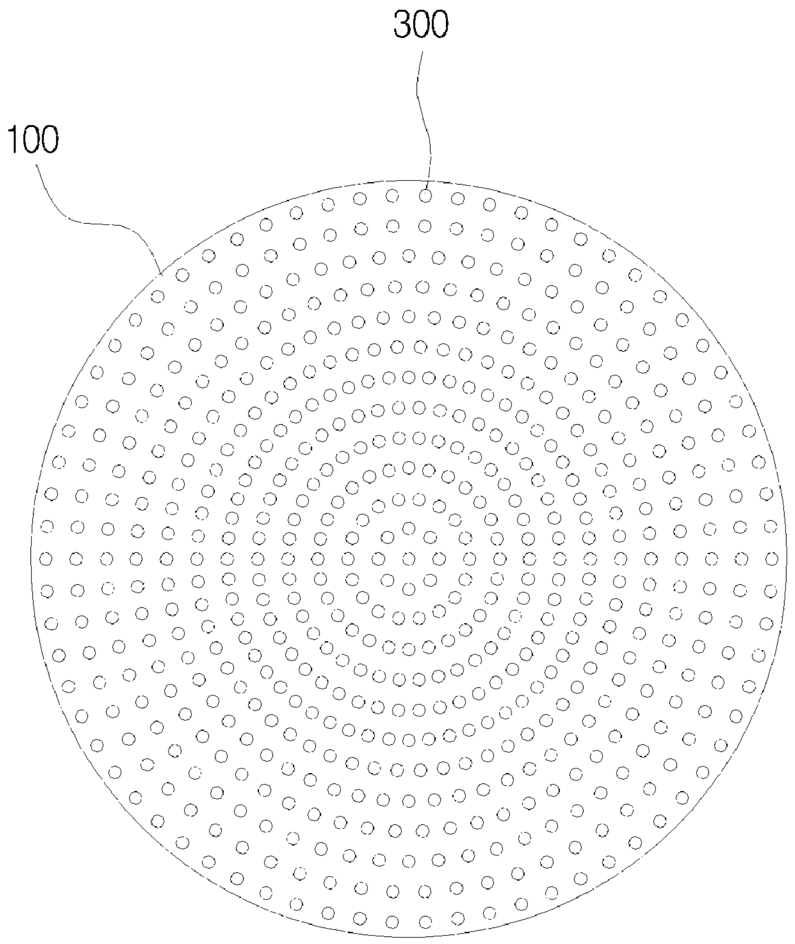
FIG. 3 is a plan view showing a preferred embodiment of the present invention.

The base plate 100 is a component that is worn and fixed around a person's head as shown in FIGS. 1 to 3, and formed of a variety of soft materials comfortable to wear, and the upper plate is formed of a relatively hard material, where a plurality of insertion holes 110 for selectively inserting and separating hair units 200 is formed to be spaced apart from each other at regular intervals.

The insertion holes 110 may be formed in various shapes.

The hair unit 200 is a hair unit used in a general wig as shown in FIGS. 1 to 3, and an insertion unit 210 inserted into the insertion hole 110 is formed on the bottom. At this point, normally, the overall color of the hair unit 200 may be black or may be expressed in a transparent color. Since only the hair units 200 that cannot operate due to damage may be replaced through the insertion and separation structure of the hair unit 200, economic efficiency can be increased.

Figure 8:
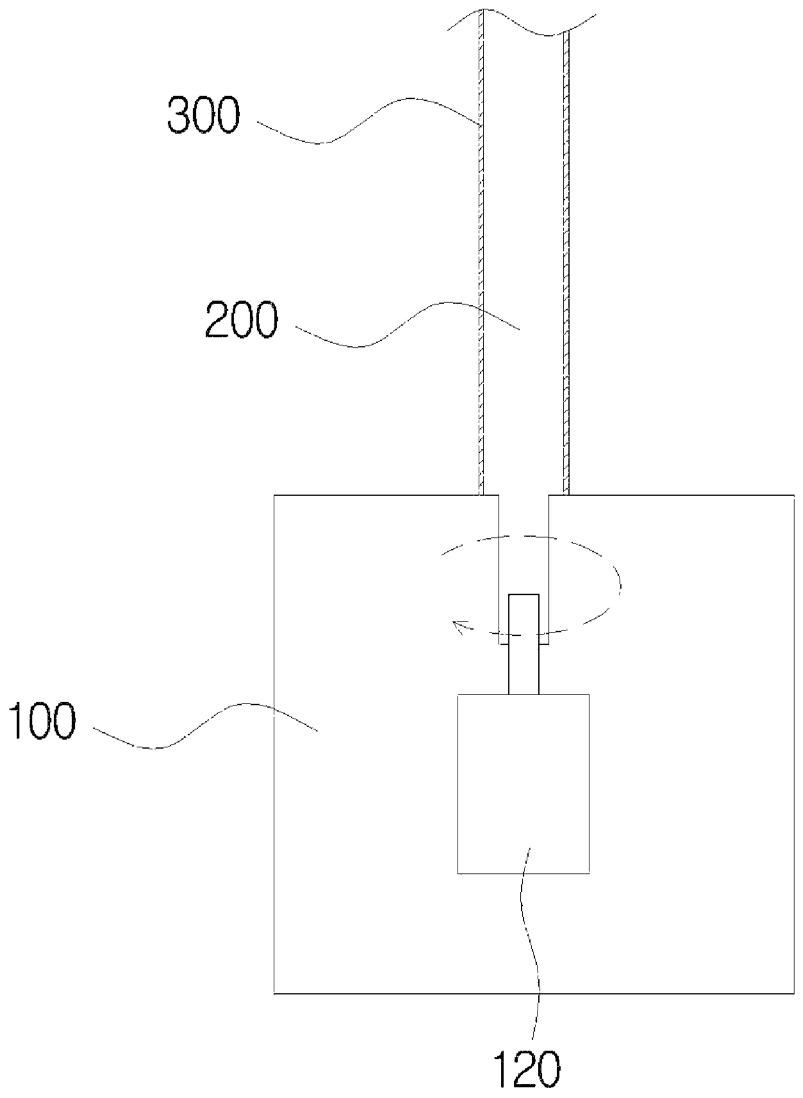
FIG. 8 is a view showing another embodiment of the present invention.

Here, although a driving motor 120 is configured in a portion adjacent to the insertion hole 110 of the base plate 100 and a separate fixing member is connected to an end of the driving motor 120 as shown in FIG. 8, the hair unit 200 is configured to rotate through the operation of the driving motor by fixing the insertion unit 210 of the hair unit 200 to an end of the driving motor.

When the transparent microLED display skin 300, the master part 400, the remote slave 500, and the smartphone 600 described below are configured and used, the hair unit 200 may rotate while light of a color is emitted, and therefore, there is an effect of enhancing the fun in using the wig.

Figure 4:
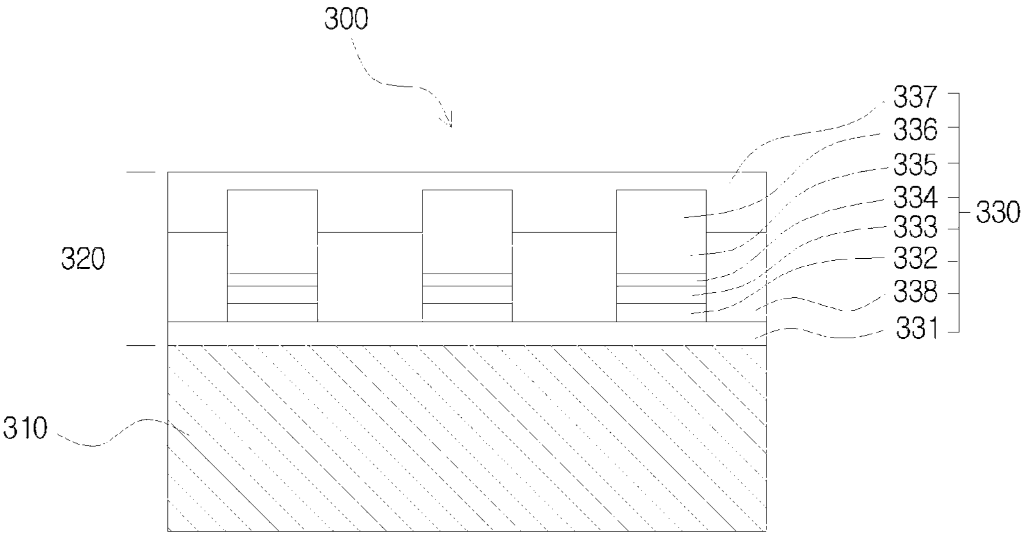
FIG. 4 is a view showing a transparent microLED display skin of the present invention.
Figure 4:
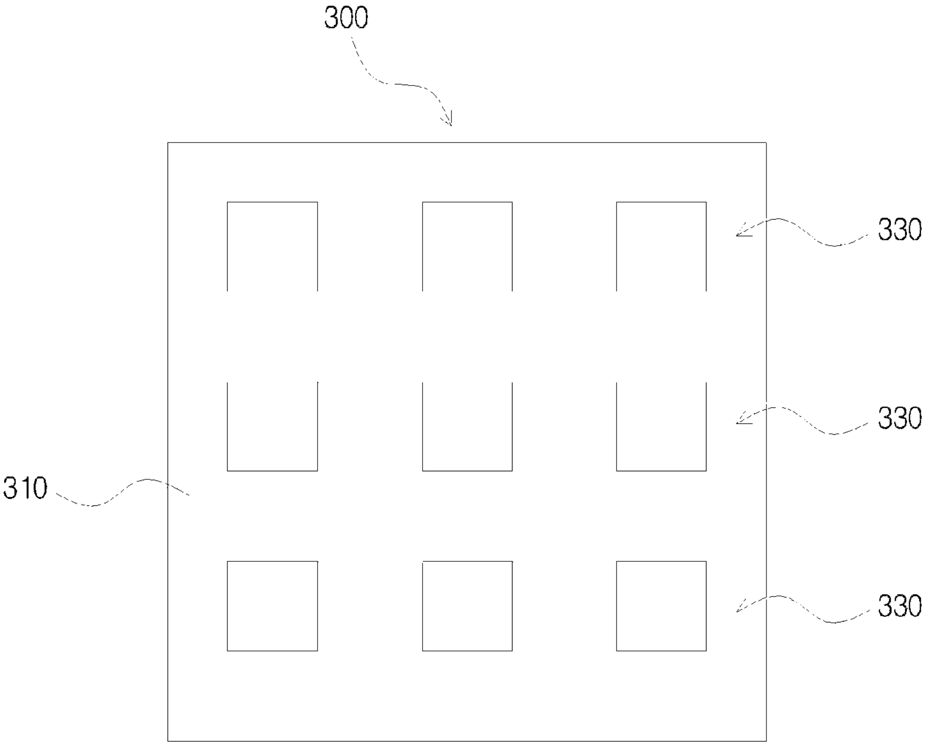

Meanwhile, as shown in FIG. 4, the transparent microLED display skin 300 is configured of a transparent flexible substrate 310 having transparency and flexibility, and a semiconductor device layer 320 having microLED pixels 330 transferred and attached on the transparent flexible substrate 310, to be fully or partly coated on the surface of the hair unit 200.

That is, since the hair unit 200 coated with the transparent microLED display skin 300 may be independently and easily separated, hair units 200 of various shapes and sizes may be used, and normal hair units not coated with the transparent microLED display skin 300 may also be used.

The microLED display is a display in which microLED particles with a size of 5 to 100 μm (1/100,000 Cm) are connected one after another on a substrate (a transparent substrate in the present invention), and it is suitable for implementing a flexible or rollable screen by using an LED chip itself as a pixel, may be used for a long time as power consumption is very small compared to an OLED, and is much excellent from the aspect of illuminance, saturation, and power efficiency compared to existing OLEDs.

The transparent microLED display skin 300 as described above is attached to be coated on the surface of the hair unit 200, and the transparent microLED display skin 300 uses a transparent flexible substrate 310 having both transparency and flexibility to function as the hair unit 200 as is even when the microLED display does not work, and the pixels made of microLED chips, i.e., the microLED pixels 330, are also configured to maximize the transparency.

On the other hand, the transparent microLED display skin 300 of the present invention is configured by implanting a semiconductor device layer 320 having numerous microLED pixels 330 made of micro p-n diode layer on the transparent flexible substrate 310 in a micro transfer printing technique, and at this point, in performing the transfer printing technique, it is preferable to transfer and attach 10,000 or more microLED pixels 330 per second on the transparent flexible substrate 310 using a roll transfer technique.

The microLED pixels 330 are prepared on a native substrate and then transferred and printed on the transparent flexible substrate 310, and the native substrate and unnecessary portions are then removed thereafter.

The transparent flexible substrate 310 has transparency and flexibility and is selected in a thickness range among 5 to 10 μm, 10 to 50 μm, 50 to 100 μm, 100 to 200 μm, 200 to 500 μm, 0.5 to 1 mm, 1 to 5 mm, and 5 to 10 mm.

That is, as shown in FIG. 4, the transparent microLED display skin 300 is a configuration in which the semiconductor device layer 320 having microLED pixels 330 is formed to be attached on the transparent flexible substrate 310 having both transparency and flexibility.

The microLED pixel 330 of the semiconductor device layer 320 is configured of a positive electrode layer 331, a transparent conductive layer 332, a transparent p-electrode layer 333, a p-GaN layer 334, an active layer 335, an n-GaN layer 336, and an upper transparent n-electrode layer 337, and a transparent insulating layer 338 is formed between the microLED pixels 330. Each of the microLED pixels 330 formed in the semiconductor device layer 320 is a p-n diode layer, which is configured of a compound semiconductor having a band gap corresponding to a specific region in the spectrum, and for example, it is formed of gallium nitride (GaN), which is a III to V nitride material.

The transparent p-electrode layer 333 is a layer for supplying power, and forms an electrode with an oxide containing Al, Ga, Ag, Sn, In, Zn, Co, Ni, or Au having a transmittance of 70% or more. The positive electrode layer 331 becomes a circuit pattern, a bump, or a conductive adhesive layer, and the transparent n-electrode layer 337 has electrical conductivity. The positive electrode layer 331 may be selected from a group of silver and nickel having reflectivity to the visible spectrum, and forms a latent reflective mirror layer.

In addition, the present invention may implement the microLED display skin 300 in full color by arranging three elements, i.e., microLED panels, having red (R), green (G) and blue (B) colors.

In other words, in the present invention, when the transparent microLED display skin 300 of the hair unit 200 does not operate, the color and design of a general hair unit are expressed, and when the transparent microLED display skin 300 operates, various colors may be output to the outside.

Here, when a specific transparent microLED display skin 300 is controlled through the APP, the transparent microLED display skin 300 is controlled by the master unit 400 or the remote slave 500 close to the specific transparent microLED display skin 300.

In addition, the transparent microLED display skin 300 is configured to be fully or partly coated on the outer surface of the hair unit 200, and may express various colors on the hair unit 200 under the control of the smartphone 600 described below.

Figure 5:
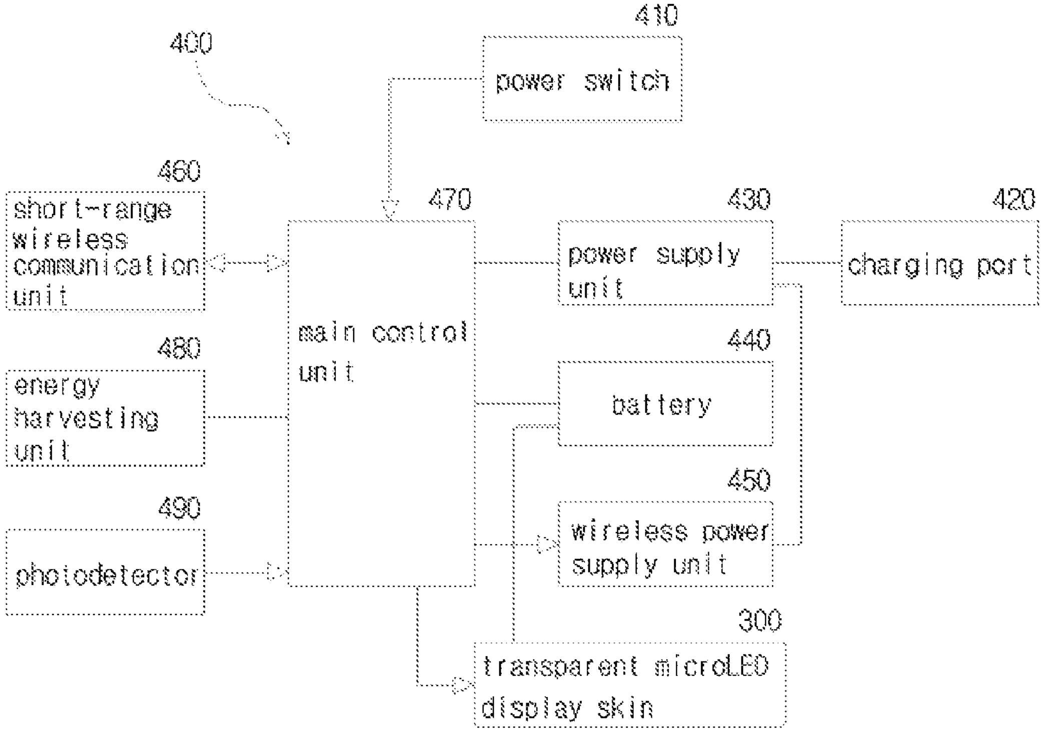
FIG. 5 is a block diagram showing a preferred embodiment of a master unit of the present invention.

Meanwhile, the master unit 400 is configured on the base plate 100 as shown in FIG. 5, and is configured of a power switch 410 for controlling a power supply unit 430, a charging port 420 for charging a battery through a USB cable, the power supply unit 430 controlled by the power switch 410, the battery 440 for storing power charged through the charging port 420, a wireless power supply unit 450 having a wireless electric coil to wirelessly supply power to the power supply unit 430, a short-range wireless communication unit 460 for performing short-range wireless communication with external devices and other devices including a smartphone 600, a main control unit 470 for controlling color expression in the transparent microLED display skin 300 of the hair unit 200, an energy harvesting unit 480 for self-generation of energy, and a photodetector 490 for detecting brightness of light outside the wig.

It is preferable that the IC chip of the main control unit 470 embedded in the base plate 100 is implemented as an application specific integrated circuit (ASIC), and wireless electricity and the energy harvesting unit 480 is able to supply energy by applying a solar cell (photovoltaic cell).

Figure 6:
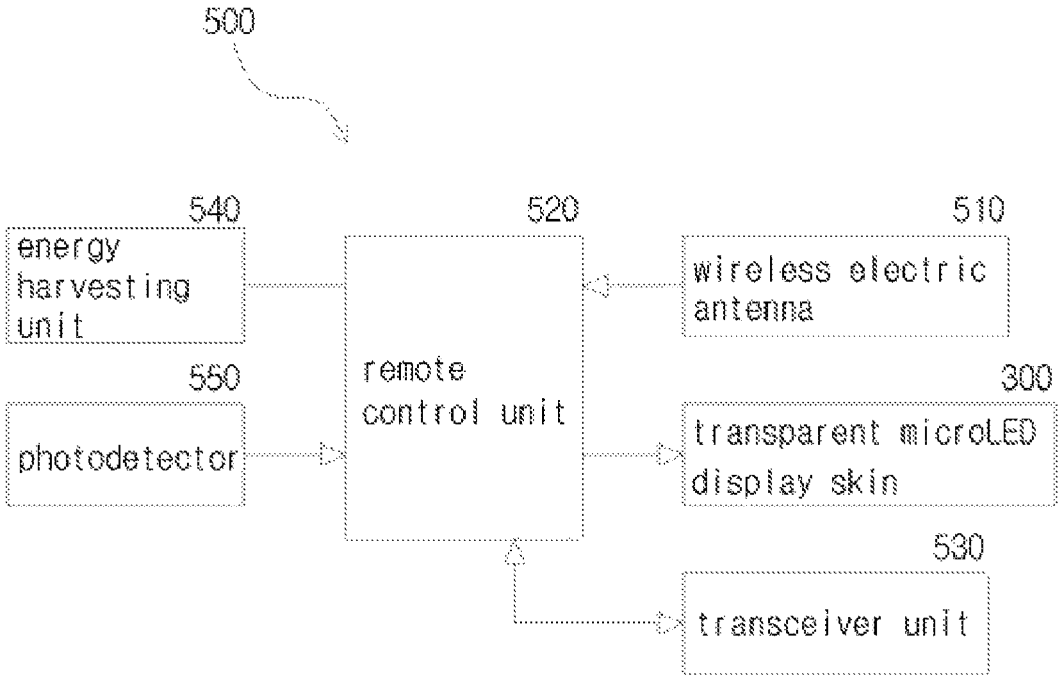
FIG. 6 is a block diagram showing a preferred embodiment of a remote slave of the present invention.

On the other hand, as shown in FIG. 6, the remote slave 500 for wirelessly receiving power supplied from the master unit 400 configured in the base plate 100 is configured at a position spaced apart from the master unit 400 of the base plate 100 by a predetermined distance, and includes a wireless electric antenna 510 for receiving power generated by the wireless power supply unit 450, a remote control unit 520 formed in an IC chip for driving and controlling the transparent microLED display skin 300, a transceiver unit 530 for performing close proximity remote transmission and reception with the master unit 400, an energy harvesting unit 540 for self-generation of energy, and a photodetector 550 for detecting brightness of light outside the wig.

The integrated circuit (IC) of the remote control unit 520 may configure a micron-scale integrated circuit using a complementary-metal-oxide semiconductor (CMOS), and the area of the IC chip is 1 mm×1 mm, and the thickness is preferably 0.5 mm.

Meanwhile, power generated through the resonance phenomenon in the wireless electric coil of the wireless power supply unit 450 configured on the base plate 100 of the wig of the present invention is received by the wireless electric antenna 510 of the remote slave 500, and the power received under the control of the remote controller 520 is used to drive the transparent microLED display skin 300.

Here, the energy harvesting units 480 and 540 are means for harvesting energy in the surroundings and may generate power without receiving power from a separate battery and supply the power to each part inside, and are preferably configured of any one or a combination of a photoelectric element, a thermoelectric element, a piezoelectric element, and a wireless electric conversion element. The photodetectors 490 and 550 detect the amount of external light applied to the wig, and then apply them to the main control unit 470 and the remote control unit 520, and the main control unit 470 and the remote control unit 520 may control the display luminance brightness of the transparent microLED display skin 300 based on the received amount of light.

Figure 7:
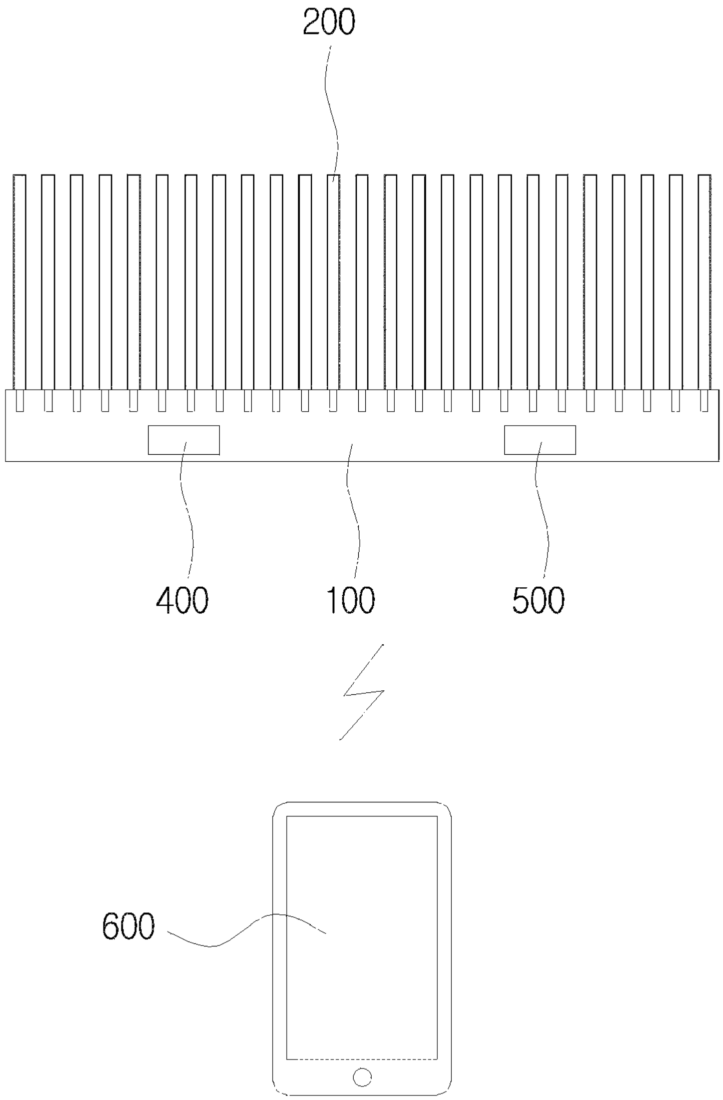
FIG. 7 is a view showing that a smart phone and a wig of the present invention operate in a short-range wireless communication method.

In addition, as shown in FIG. 7, a smartphone 600 is further provided to include an APP capable of controlling the main control unit 470 or the remote control unit 520 of the master unit 400 or the remote slave 500 through a short-range wireless communication method with the short-range wireless communication unit 460 of the master unit 400.

The wireless transmission and reception method between the master unit 400 and the smartphone 600 may use a Li-Fi technology that implements a fast communication speed using the wavelength of light emitted from an LED, and particularly, when the microLED technique of the present invention is applied, the effect of miniaturizing and lightweighting the parts is increased.

That is, through the smartphone 600 of the present invention, as shown in FIG. 7, change of design and color may be controlled through short-range remote control between the self-customized microLED wig and the smartphone 600. The master unit 400 may wirelessly connect to the smartphone 600 using a short-range wireless communication method such as Bluetooth communication, Wi-Fi communication, NFC communication, IR communication, or Li-Fi communication. When users selectively control the APP included in the smartphone 600, various colors may be expressed on the transparent microLED display skin 300 according to a control command.

In addition, in operating the transparent microLED display skin 300 using the APP of the smartphone 600 that controls the master unit 400 and the remote slave 500 of the present invention, when a control command is initially transmitted to the master unit 400, the master unit 400 operates the transparent microLED display skin 300, and when the distance between the master unit 400 and a specific transparent microLED display skin 300 is long, the master unit 400 transmits the control command to the remote slave 500, and the remote slave 500 operates the corresponding transparent microLED display skin 300.

That is, when a specific transparent microLED display skin 300 is initially operated using the smartphone 600, the master unit 400 or the remote slave 500 close to the specific transparent microLED display skin 300 in distance operates the specific transparent microLED display skin 300, and thus there is an advantage of quickly and accurately controlling the transparent microLED display skin 300.

According to the self-customized microLED wig of the present invention, since it is possible to immediately respond to a situation in the field as various colors may be changed with ease in accordance with the current situation of a user in a ceremony, festival, party, or event, while maintaining the original purpose of wigs used recently, this is a useful invention that can enhance the fun of users by variously changing colors and have an effect of using for an extended period of time owing to low power consumption, rechargeable battery, and autonomous power supply.

The invention claimed is:

1. A self-customized microLED wig capable of emitting light, the wig comprising:

a base plate worn and fixed on a person's head;

a plurality of hair units configured on the top of the base plate to be spaced apart from each other at regular intervals;

a transparent microLED display skin configured to include a transparent flexible substrate having transparency and flexibility, and a semiconductor device layer having microLED pixels transferred and attached on the transparent flexible substrate, and fully or partly coated on the surface of the hair unit;

a master unit configured on the base plate and provided with a power switch for controlling a power supply unit, a charging port for charging a battery through a USB cable, the power supply unit controlled by the power switch, the battery for storing power charged through the charging port, a wireless power supply unit 450 having a wireless electric coil to wirelessly supply power to the power supply unit, a short-range wireless communication unit for performing short-range wireless communication with external devices and other devices including a smartphone, a main control unit for controlling color expression in the transparent microLED display skin of the hair unit, an energy harvesting unit for self-generation of energy, and a photodetector for detecting brightness of light outside the wig;

a remote slave configured at a position spaced apart from the master unit of the base plate by a predetermined distance, and provided with a wireless electric antenna for receiving power generated by the wireless power supply unit, a remote control unit for driving and controlling the transparent microLED display skin, a transceiver unit for performing close proximity remote transmission and reception with the master unit, an energy harvesting unit for self-generation of energy, and a photodetector for detecting brightness of light outside the wig; and the smartphone including an APP capable of controlling the main control unit or the remote control unit of the master unit or the remote slave through a short-range wireless communication method with the short-range wireless communication unit of the master unit.

2. The wig according to claim 1, wherein the photodetectors detect an amount of external light applied to the wig, and then apply them to the main control unit and the remote control unit, and the main control unit and the remote control unit control display luminance brightness of the transparent microLED display skin based on the received amount of light.

3. The wig according to claim 1, wherein the energy harvesting units are configured of any one or a combination of a photoelectric element, a thermoelectric element, a piezoelectric element, and a wireless electric conversion element.

4. The wig according to claim 1, wherein when a specific transparent microLED display skin is controlled through the APP, the transparent microLED display skin is controlled by the master unit or the remote slave 500 close to the specific transparent microLED display skin.

* * * * *